PHOTO-OPTICAL DATA STORAGE SYSTEMS

Filed May 19, 1965

RICHARD F. BARTLETT
INVENTOR.
BY
ATTORNEYS

United States Patent Office 3,452,331

Patented June 24, 1969

3,452,331

PHOTO-OPTICAL DATA STORAGE SYSTEMS

Richard F. Bartlett, Lexington, Mass., assignor to Itek Corporation, Lexington, Mass., a corporation of Delaware Filed May 19, 1965, Ser. No. 457,013
Int. Cl. G11b *7/00;* G03c *1/72*
U.S. Cl. 340—173 6 Claims

ABSTRACT OF THE DISCLOSURE

A photo-optical data storage and retrieval system having circuitry for recording and reading out digital information stored therein and, additionally, having circuitry for identifying the presence of erroneously recorded data and recording the location of such data upon the photosensitive storage media which comprises methylene blue as the photosensitive component thereof.

Figure 1:
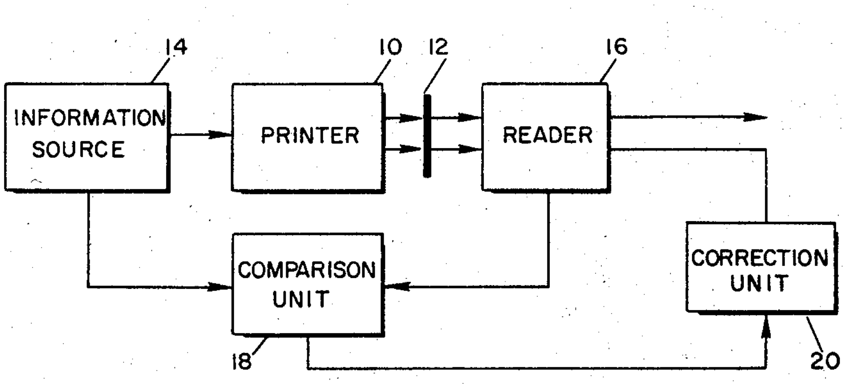

This invention relates to an improved data storage system. More precisely, the invention disclosed herein relates to an improved digital data storage system which employs photographic storage techniques in combination with a photosensitive medium inherently capable of storing high information densities and also inherently capable of having the information stored therein modified.

High density digital data storage systems may utilize photographic techniques to record high densities of binary coded information in the form of alternate light and dark areas on photosensitive surfaces of disks, drums or tapes. For example, one such system presently in use employs as the photosensitive medium thereof, a disk having silver halide coated on the surface thereof. One disadvantage in the aforementioned system is that the density of the information stored in said medium is limited by the presence of imperfections in said medium. Said imperfections arise by way of an unequal or nonuniform dispersion of the granular silver halide in the binder or gel. Accordingly, elaborate and highly specialized techniques are required to ensure a suitably uniform dispersion of silver halide in the gel or binder so that the photosensitive medium utilizing same can record high densities of information with an acceptable degree of accuracy and precision.

In the normal operation of a high density digital data storage system employing a radiation sensitive medium comprising silver halide, a printer records on said medium, information received from an information source such as a high speed electronic digital data processing machine. The medium is then developed and the information stored therein is retrieved in the form of a visible image. The information, now in readable form, is then compared to the information photographically applied to the medium. As stated, more often than not, especially when high information densities are involved, e.g., $10^6$ bits per square inch or greater, errors are detected in many areas throughout the medium. Accordingly, said medium must be corrected after development or oftentimes if said errors occupy substantial areas of the medium, said medium is discarded and the entire operation repeated with no assurance that the next medium will record the information supplied thereto in a fashion any more reliable than that of the medium discarded.

A method to solve the above-mentioned disadvantages has been proposed in commonly owned copending U.S. patent application No. 359,970, now Patent No. 3,365,706, of G. W. King filed April 15, 1964 which is incorporated herein by reference. Essentially said method involves a high density, digital data storage system which includes data storage media comprising a photosensitive photoconductor material such as particulate titanium dioxide, zinc oxide, lead oxide and the like. Information stored in media of the type described therein is stored in reversible form but the presence thereof can be detected without development to a visible image, such as by way of scanning said media with an infrared beam. Accordingly the information stored in said media can be retrieved immediately after storage and thus can be compared directly to the information photographically supplied to the media. Since development of the media is not required to determine the presence of information therein, corrections can be made while the information source still retains the quantity of information which was erroneously recorded in the media.

A principal object of the present invention is to provide an improved digital data storage system.

Another object of the present invention is to provide an improved high density, digital data storage system in which the reliability of information stored in the media thereof can be determined substantially immediately after said information is stored in said media.

Another object of the present invention is to provide improved media of an inherently high reliability which are especially useful in high density, digital data storage systems.

Still another object of the present invention is to provide improved media in which the presence of information stored therein from a high speed electronic digital data information source can be conveniently detected within an increment of time during which said information source can retain the information supplied to said media.

Other objects of the present invention will in part appear hereinafter or will in part be obvious to those skilled in the art.

Broadly, the above objects and advantages are realized in accordance with the practice of the present invention by a high density, digital data storage system comprising an integration of some conventional structural elements and parts normally used in said systems together with the combination of a media comprising methylene blue as a photosensitive component thereof and a source of radiant energy which can irradiate selected segments of said media in response to, or in accordance with, signals from an information source. The system of my invention comprises a media inherently having a high degree of reliability in that said media can accurately and precisely record high densities of information and at the same time offers the advantage of detecting and correcting any errors immediately after the information is stored therein.

DESCRIPTION OF MEDIA OF THE PRESENT INVENTION

The media included in the data storage system of the present invention comprise two essential ingredients: a radiation sensitive system wherein methylene blue is the photosensitive component thereof and a suitable transparent or translucent substrate. The particular transparent or translucent substrate selected is not in itself especially critical and said substrate can be flexible or rigid. Representative preferred transparent or translucent substrates include polycarborates, polyethylene terephthalate more commonly known as "Mylar," polyesters such as those known as "Scotchpar," cellulose acetate and the like.

For the purposes of the present invention, methylene blue is a compound which comprises the following basic structure:

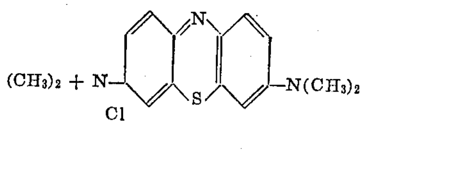

Methylene blue is used in the art as a dye and for limited medicinal purposes and is also known as methylthionine chloride. The compound is conveniently prepared by the oxidation of para-amino dimethylanaline with ferric chloride in the presence of hydrogen sulfide. Other compounds comprising the above structure include the metal salts of methylthionine chloride such as the zinc chloride double salt thereof. It is to be understood that such derivatives comprising the above-mentioned structure are also useful in the practice of the present invention.

Many manners of applying methylene blue to the aforesaid substrates are suitable in the preparation of media useful in my invention. An especially convenient method of preparing media of the present invention is to merely immerse said substrate in a solution of said methylene blue or a solution of methylene blue and binder. Suitable solvents for methylene blue include water, alcohol, chloroform and the like. Also suitable media can be prepared by coating solutions comprising methylene blue on said substrates such as by way of spraying, brushing, or rolling techniques.

A special advantage realized in accordance with the practice of my invention involves the mutual solubility of methylene blue with many of the natural or synthetic materials which are useful as binders in image storage media. Accordingly the radiation sensitive systems of media of the present invention can be readily and easily prepared without the use of specialized dispersion techniques such as ball milling or the like normally required in the preparation of conventional radiation sensitive systems such as those comprising granular silver halides. Suitable binders include those organic resins which are transparent or translucent when cured such as a copolymer of butadiene and styrene more commonly known as "Pliolite" and polyamide more commonly known as "Zytel 61." Other binders include polyvinyl acetate, partially hydrolyzed polyvinyl acetates, polyvinyl alcohol and polyvinyl chloride.

The concentration of methylene blue in solutions suitable for application to transparent or translucent substrates can vary over a wide range. For example, the concentration of methylene blue in said solutions can represent from about 0.01 percent by weight to about 30 percent by weight or oftentimes somewhat higher. In general, the preferred concentrations are those in which methylene blue represents from about 0.5 percent by weight to about 15 percent by weight of said solutions.

DESCRIPTION OF THE METHOD OF EXPOSING AND DEVELOPING MEDIA OF THE PRESENT INVENTION

Exposure of the media of the present invention to a source of activating radiation such as a laser beam establishes a reversible image pattern therein conforming to the pattern of radiant energy applied thereto which in the system of the present invention is usually in the form of a "bit."

Thus unlike image patterns obtained upon exposure of classical silver halide media, the patterns stored in my media can be erased therefrom if desired. The interval of time during which said reversible pattern can be retrieved will depend primarily on the intensity of radiation applied to the media and the character of the environment in which the media is maintained after exposure. For example, several weeks can intervene between exposure of media of the present invention and retrieval of the image pattern, especially if radiation of high intensity is used in exposure and if the so exposed media are subsequently stored in an atmosphere chaarcterized by the absence of substantial amounts of molecular oxygen.

This feature of reversibility is especially attractive since, in accordance therewith, my media need not necessarily be produced in an environment characterized by the absence of visible light. Obviously, such an accomplishment is not possible with classical silver halide type media. In this respect, it should pointed out that media of the present invention produced in the light or otherwise exposed to light should be dark adapted prior to the exposure thereof in order to obtain quality images. The length of time for dark adapting said media will vary depending primarily on the degree of prior exposure thereof to radiant energy. As an illustration, however, oftentimes dark adaption can be accomplished by storing said media in the dark for less than about 24 hours. Usually dark adaption can be effectively accomplished by wrapping the media in dark paper while said media is enroute to the ultimate consumer.

The reversible image pattern stored in media of the present invention can be readily converted to an irreversible form by contacting said media with a chemical redox system capable of reacting on contact with the irradiated portion of the media to deposit thereon chemical substances so that said pattern can be interpreted either directly or subsequently by visual readout. The most preferred redox systems are those in solution form comprising metal compounds which can react with said irradiated portion to precipitate or otherwise deposit thereon reduced species of said compounds. Especially, preferred metal compounds are those copper, silver, mercury or gold and the other noble metals. It is to be understood that said irreversible image pattern can be latent or visible depending upon such factors as the particular redox system used, the intensity of radiation originally imparted to the media and the length of time intervening between the conversion from the reversible form to the irreversible form.

More often than not, however, the so formed irreversible image pattern is latent and accordingly an amplification step is required. Amplification is best accomplished by contacting the media containing the irreversible image pattern with amplification solutions of the type described in commonly owned copending U.S. patent application No. 360,112 of E. Berman et al. filed Apr. 15, 1964. Said amplification solutions include a reducing agent for the metallic species deposited on said latent irreversible image pattern and an acid which can form a salt with said metal species. Representative reducing agents useful in said solutions include hydroquinone, chlorohydroquinone, dichlorohydroquinone, bromohydroquinone, metol, phenidone, amidol, and p-phenylenediamine. Representative acids useful in said amplification solutions include such organic and inorganic acids as citric acid, oxalic acid, nitric acid, acetic acid, perchloric acid, phosphoric acid, or the like.

DESCRIPTION OF A DIGITAL DATA STORAGE SYSTEM OF THE PRESENT INVENTION

Figure 2:
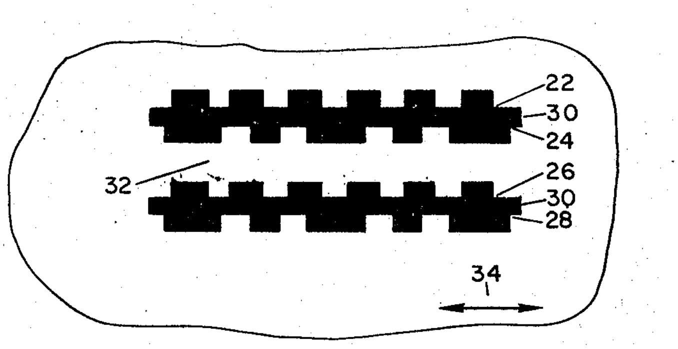

The features of my data storage system and the advantages to be obtained therefrom as well as the interrelationship between the strutural elements thereof will be better understood by the attached drawings in which FIGURE 1 is a generalized schematic diagram of an optical data storage system embodying the invention and FIGURE 2 illustrates a suitable arrangement of recorded information for media of the present invention.

Referring now to FIGURE 1, printer 10 which prints by way of beam radiation from a helium neon laser having a wavelength output at about 6300 A. prints data received from information source 14 on a photosensitive media, e.g., disk 12, which comprises methylene blue as the photosensitive component thereof. Printer 10 prints the data in disk 12 in the form of a reversible image pattern which conforms to the pattern of radiant energy applied thereto from said laser beam. In the system of the present invention, the pattern is in the form of a bit and the pattern can be detected visually since bleaching occurs in that portion of the media exposed to the laser beam. Accordingly, said pattern can be detected immediately after storage thereof by a reader 16 which preferably employs means which can detect differences in light transmission of the exposed and nonexposed portion of the media. The output of reader 16 is compared in a comparison unit 18 with the information just previously supplied to printer 10 by source 14. In the preferred embodiment of my invention, the increment of time involved in detecting the information stored and comparing same is of short duration and during said increment of time, the information source retains the information which is the subject of the detection and comparison operations. Accordingly, when the comparison unit 18 detects a difference in the information from its two input sources, a signal is transmitted to correction unit 20 and appropriate corrective action is taken. The correction unit can be similar to those described in detail in said copending U.S. patent application No. 359,970 and the corrective action taken thereby can include those set forth in said application. For example, the correction unit can involve means to indicate an error in areas of the media or means that reapplies any data signals to the media which were erroneously recorded therein. After the desired quantity of information is stored in the disk, said disk can be developed to provide a permanent visual record of said information.

It is to be understood that additional information can be added to media of the present invention especially prior to the development thereof. Also information stored in said media can be altered such as by addition thereto or by erasure thereof. For example, errors in areas of said media can be erased therefrom such as by selectively heating said error containing area. Thereafter development of said media will provide a media which is free of error areas.

FIGURE 2 shows the manner in which data may be recorded on the disk 12 of FIGURE 1. A multiple track system is used, with a series of parallel circular tracks extending around the disk. Fragments of four of these tracks indicated generally at 22, 24, 26 and 28 are shown in FIGURE 2. Each track comprises a series of successive opaque squares and transparent or translucent squares. By way of example, the binary "zero" may be represented by a translucent square followed by an opaque square. A binary "one" is the reverse. As shown in FIGURE 2, the tracks are arranged in pairs 22–24 and 26–28, with the tracks in each pair being separated by an opaque strip 30. The pairs of tracks are separated from each other by translucent strips 32. A system of this type is described in U.S. Patent No. 2,843,841 and therefore the details need not be printed here. In any case, it should be understood that the invention is not limited to any particular arrangement of optically recorded data.

It will be apparent that many variations of the details described above for the purposes of illustrating our invention can be utilized without departing from the spirit and scope of the present invention. Accordingly, it is intended that the matter set forth in the above description and drawings be considered as illustrative in nature and in no way be construed so as to limit the present invention beyond those limitations expressly set forth in the present specification or in the claims which appear hereinafter.

Having described my invention together with preferred embodiments thereof as well as manners of practicing same, what I declare as new and desire to secure by U.S. Letters Patents is as follows:

1. A high density, digital data storage system of the optical type comprising in combination:

(a) a radiation sensitive recording medium comprising a transparent substrate and methylene blue as the photosensitive component thereof;

(b) an information source capable of issuing data signals;

(c) a printer comprising a source of radiant energy which in response to said data signals applies a pattern of radiant energy to said medium thereby establishing a reversible image pattern in said medium conforming to said data signal;

(d) reading means which can detect said reversible image pattern in said medium and which can develop a reading signal indicative of said image pattern in said medium;

(e) comparison means which can compare said reading signal with said data signal and can provide an error signal indicating a lack of identity between said reading signal and said data signal.

2. The system of claim 1 wherein the source of radiant energy of said printer is a helium neon laser having a wavelength output at about 6300 A.

3. The system of claim 1 wherein said information source is a high speed, electronic, digital data processing machine.

4. The system of claim 1 wherein said reading means detects said reversible image pattern by differences of light transmission of the exposed and nonexposed portion of said medium.

5. The system of claim 1 including means responsive to said error signal means which can provide an indication in said medium in areas thereof in which said comparison means indicated a lack of identity between said reading signal and said data signal.

6. The system of claim 1 including correction means responsive to said error signal to cause said information source to reissue to said printer, data signals which provided a reading signal which said comparison means indicated lacked identity with said data signal.

References Cited

UNITED STATES PATENTS 3,148,355 9/1964 Sliter ---------------- 340—173
3,131,628 4/1964 Wolfson ------------ 340—173

OTHER REFERENCES

"Light Sensitive Systems," by J. Kosar, copyright May 1965, John Wiley & Sons Inc., page 94 relied on.

TERRELL W. FEARS, *Primary Examiner.*

U.S. Cl. X.R.

96—89; 179—100.3